United States Patent [19]
Kemp et al.

[11] Patent Number: 4,768,387
[45] Date of Patent: Sep. 6, 1988

[54] FLOWMETER

[75] Inventors: Charles W. Kemp; Kamal A. Khan, both of Arlington, Tex.

[73] Assignee: Milltronics, Inc., Arlington, Tex.

[21] Appl. No.: 49,666

[22] Filed: May 13, 1987

[51] Int. Cl.[4] ............................................. G01F 1/30
[52] U.S. Cl. ..................................... 73/861.73; 73/3
[58] Field of Search ................... 73/861.73, 861.74, 3; 222/55

[56] References Cited

U.S. PATENT DOCUMENTS

| | | | |
|---|---|---|---|
| 3,613,449 | 10/1971 | Soejima | 73/228 |
| 3,640,135 | 2/1972 | Tomiyasu | 73/228 |
| 3,742,762 | 4/1973 | Tomiyasu | 73/228 |
| 4,128,001 | 12/1978 | Marks | 73/1 B |
| 4,354,622 | 10/1982 | Wood | 73/861.73 |
| 4,380,175 | 4/1983 | Griffen | 73/862.67 |
| 4,407,380 | 10/1983 | Elder | 177/145 |
| 4,440,029 | 4/1984 | Tomiyasu | 73/861.73 |

FOREIGN PATENT DOCUMENTS 2020038 11/1979 United Kingdom .

OTHER PUBLICATIONS

Milltronics brochure for Model E-40 Flowmeter, Nov., 1984.

Primary Examiner—Donald O. Woodiel
Attorney, Agent, or Firm—Lorusso & Loud

[57] ABSTRACT

An impact flowmeter utilizes a part cylindrical impact plate mounted by a parallelogram strain gauge from the top of a cylindrical housing with which it is coaxial. Material to be metered enters the flowmeter through an inclined inlet tube so as to impact the inner surface of the impact plate, and the horizontal reaction force from the plate is measured by the strain gauge. The flowmeter is simple to construct and can be made very compact, while the cylindrical surfaces of the principal components minimizes disturbances of the flow of material through the unit and thus provides good linearity.

5 Claims, 2 Drawing Sheets

FLOWMETER

FIELD OF THE INVENTION

This invention relates to flowmeters for fluent materials of the deflector plate type in which a flow of material to be metered is directed against a deflector plate, and a component of the reaction force applied by the plate, usually the horizontal component, is measured to provide an indication of the rate of flow of material.

BACKGROUND OF THE INVENTION

Flowmeters of the above type have been known for a number of years, typical examples being shown in U.S. Pat. No. 3,613,449 issued in October 1971 to Soejima et al, U.S. Pat. No. 3,640,135 issued in February 1972 to Tomiyasu et al, and U.S. Pat. No. 3,742,762 issued in July 1973 to Tomiyasu et al. Arrangements such as those shown in the Tomiyasu et al '135 patent, in which the horizontal reaction component is measured, have found the most general acceptance because the magnitude of the horizontal component will not be affected by any build up of residual material adhering to the deflector plate.

Although such flowmeters have considerable utility, they present certain problems in implementation, particularly in obtaining reliable measurement of the horizontal reaction component. The flowmeter necessarily operates in adverse environments, with typical materials being metered having a high dust content, and any mechanical pivots and other sensitive components must be protected from such dust. These problems and other relevant prior art patents are discussed in U. K. Patent Specification No. 2,020,038 (Milltronics) published Nov. 7, 1979, which discloses a flowmeter in which the horizontal component is measured by one or more strain gauge bridges in an arrangement which can be made mechanically substantially immune both from the effects of dust and material build up, and is also insensitive to uneven distribution of material impacting the deflector plate. Such flowmeters perform very satisfactorily, but present the problem that the deflector plate must be housed in a comparatively bulky rectangular housing which must be fabricated and equipped with suitable connecting and adaption hardware to connect its upstream and downstream ends to conduits of vessels, the flow between which is to be monitored. Conduits for fluent materials are commonly cylindrical tubular pipes, which further complicates installation. Even when such an arrangement is arranged at a free outlet of a tubular vessel, and a full enclosure is not required, the adaptor structure required can be quite complex, as is illustrated in U.S. Pat. No. 4,407,380 (Elder), in which a similar device is disposed at the outlet of a screw conveyor. Further examples of the complications entailed in the installation of this type of flowmeter, and its relative bulk, are found on the rear page of the brochure "Milltronics HYFLO (Trade Mark) Solids Flowmeters", published by Milltronics in November 1984.

SUMMARY OF THE INVENTION

The present invention seeks to provide an impact flowmeter operating upon the same general principles as the flowmeter of U.K. Patent Application No. 2,020,038, but which can be of simpler and more compact construction and which will be more easily installed in most instances.

According to the invention, an impact flowmeter comprises a first vertically extending cylindrical shell having a first internal diameter and providing an outlet for fluent material at a lower end thereof, a second downwardly inclined cylindrical shell having a second internal diameter less than said first internal diameter, and a lower end which enters a side wall of the first shell and opens within and intermediate the ends of the latter, said second shell providing an inlet for fluent material at its upper end, a third vertically extending semicylindrical shell having a third internal diameter intermediate said first and second internal diameters, said third shell being located within the first shell with a concave side thereof facing the lower end of the second shell, and a parallelogram strain gauge cell connected between an upper end of the third shell and an upper end of the first shell so as to sense horizontal forces applied to the third shell from the direction of the second shell.

Such a flowmeter is easily fabricated largely from sections of pipe, the only precision element involved being the parallelogram load cell. Such cells are well known, various examples being shown in U.K. Patent Application No. 2,020,038 mentioned above, and a preferred form of load cell being similar to those disclosed in U.S. Pat. Nos. 4,128,001 (Marks) or 4,380,175 (Griffen). Such a load cell not only provides excellent support for the third shell which forms the impact plate of the flowmeter, but when appropriately mounted will sense only the horizontal element of the reaction of the plate to material incident upon it through the second shell, without its output being affected by the level of incidence of the material on the plate. Since the cell is above the third shell, it is largely protected from material passing through the flowmeter.

Further features of the invention will be apparent from the following description of an exemplary preferred embodiment with reference to the accompanying drawings.

SHORT DESCRIPTION OF THE DRAWINGS

Figure 3:
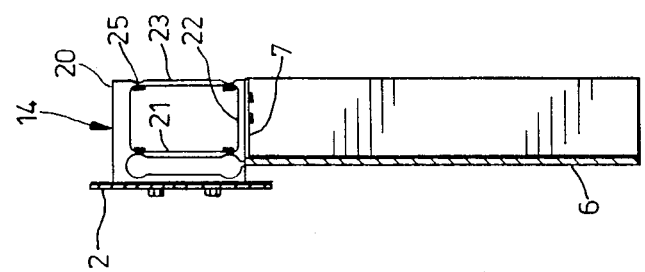
FIG. 3 is a side elevation of certain internal parts of the flowmeter with the impact plate partly cut away for clarity.
Figure 2:
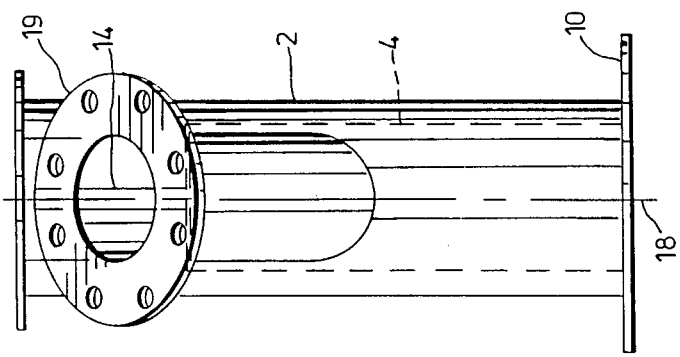
FIG. 2 is a front elevation of the flowmeter of FIG. 1, with its top cover removed.
Figure 1:
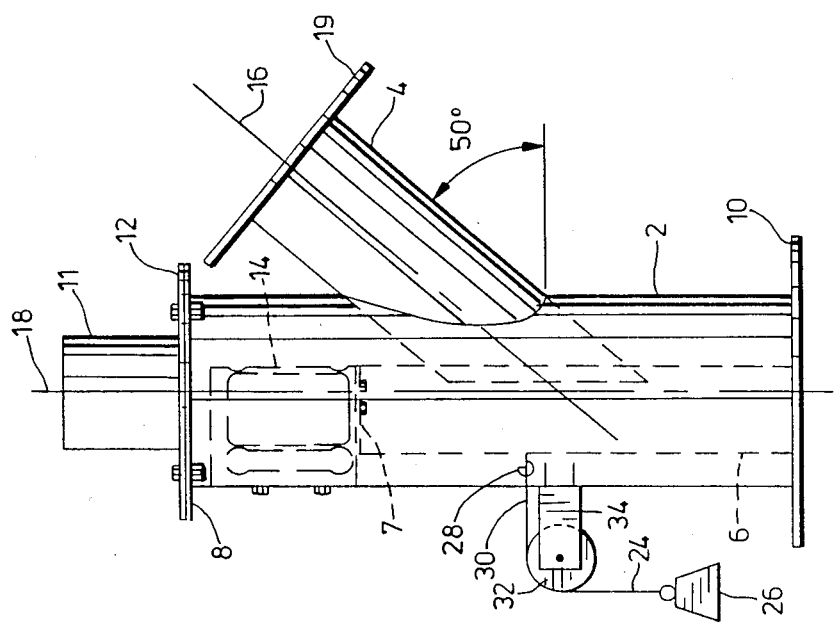
FIG. 1 is a side elevation of a flowmeter in accordance with the invention, with major internal parts outlined in broken lines.
Figure 4A:
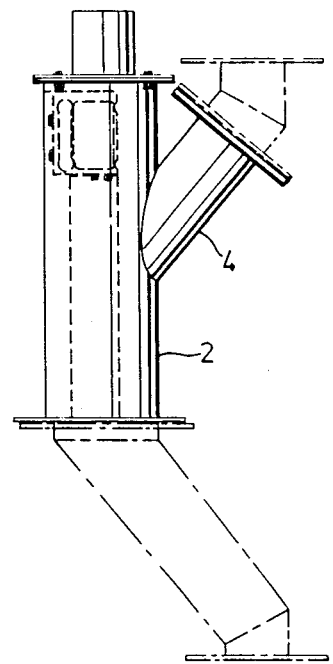
FIGS. 4a–4d are side elevations similar to FIG. 1, showing examples of different installations of the flowmeter.
Figure 4B:
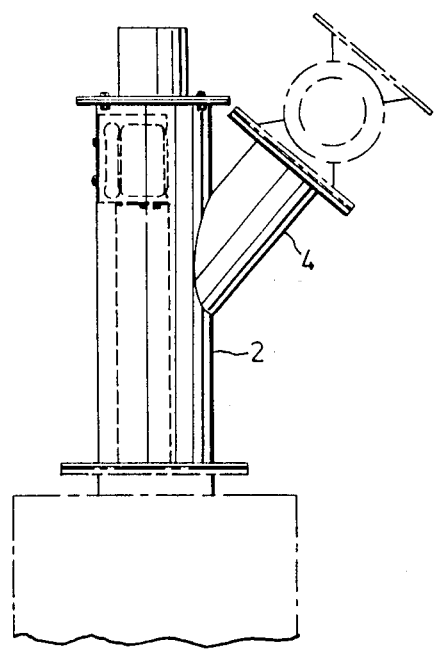
Figure 4C:
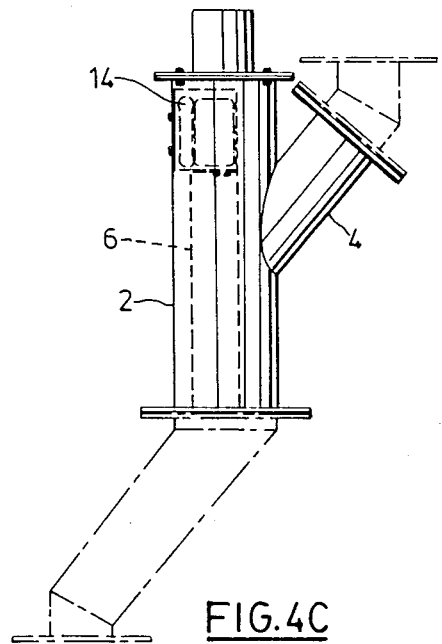
Figure 4D:
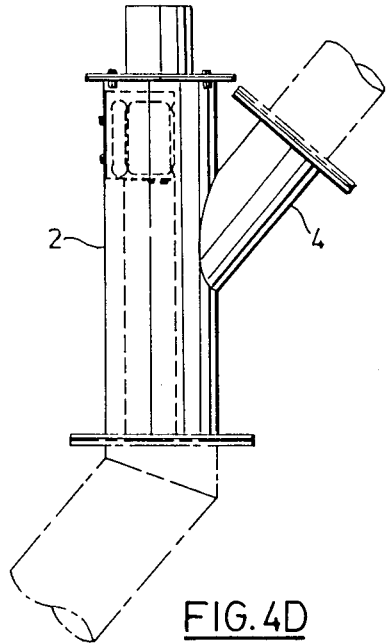

The flowmeter is formed primarily by three cylindrical or part cylindrical shells 2, 4 and 6. A first vertical cylindrical shell 2 is conveniently formed by a length of cylindrical pipe with external bolting flanges 8 and 10 at its upper and lower ends. The flange 10 is secured in use to an appropriate outlet for fluent material, as illustrated and described further in relation to FIGS. 4a–4d. A closure plate 12 is secured to the upper flange 8, and forms a convenient mounting for an enclosure 11 containing pre-amplification and calibration circuitry associated with a parallelogram strain gauge 14.

A second cylindrical shell 4 is formed by a further length of cylindrical pipe, inclined to the horizontal and having an axis 16 intersecting the axis 18 of the shell 2. The angle of inclination of the shell 4 is typically about 50°. This second shell passes through the wall of the first shell approximately midway between the flanges 8 and 10 and in the example shown terminates at an orifice in a vertical plane just short of the axis 18. A third shell 6 is internally concentric with the first shell 2, and is part cylindrical, being cut from a further length of pipe. The part cylinder is more or less a semicylinder, in this case somewhat more than a semicylinder. It is supported through a top plate 7 by the strain gauge 14 from the wall of the first shell near the top of the latter. In some instances it may be convenient to mount the strain gauge to the first shell indirectly through the closure plate 12, depending on the structure of the strain gauge, which is typically of the type described in U.S. Pat. Nos. 4,128,001 or 4,380,175 already referenced above.

An external flange 19 at the upper end of the shell 4 is connected, in use, to an inlet for fluent material as illustrated in FIGS. 4a–4d. The shell 6 extends sufficiently downward past the lower end of the shell 4 to ensure that material descending the latter under gravity will strike the shell 6 above its lower end, which in the example shown ends level with the flange 10.

The shell 2 has a larger internal diameter than the outside of the shell 6, which in turn has a larger internal diameter than at least the internal diameter of the shell 4. In the present instance, the outside diameter of the shell 4 is also sufficiently smaller than the inside diameter of the shell 6 to avoid contact between the two. Exemplary internal diameters for the first, second and third shell are 6.357 inches, 4 inches and 5 inches.

Operation of the device is extremely simple. Fluent material, such as grain or other particulate material, is delivered through an inclined chute formed by the shell 4 and strikes the inner surface of the vertical shell 6, after which it leaves the flowmeter through the shell 2. A horizontal reaction force is developed by the shell 6 which is directly proportional to the mass rate of flow of material passing down the shell 4. This reaction force is sensed by the parallelogram strain gauge 14, which, as mounted with its upper and lower pillars 20 and 22 horizontal, is sensitive only to horizontal forces which deform its cantilever arms 21 and 23, and is not significantly affected by the vertical distribution of impact forces on the shell 6. The relative resistance of strain gauge elements 25 in a strain gauge bridge incorporated by the strain gauge varies in proportion to the reaction force; the bridge is incorporated into the input circuit of an operational amplifier in the pre-amplifier circuit, which senses these changes and provides an output proportional to the horizontal force component and thus the flow rate through the apparatus. Operation is no different in principle from that of the flowmeter disclosed in the Milltronics' British patent discussed above.

The flowmeter described is particularly simple to calibrate. The preamplifier is provided in conventional manner with zero and span (amplification) adjustments. In order to calibrate the unit, assuming that it has been installed with the axis 18 of the first shell 2 accurately vertical, the preamplifier is first adjusted for a zero output with no material flowing through the meter. A cable 24 of a test weight 26 is then attached to a hook 28 secured to the outer surface of the shell 6, access being through an aperture 30 in the shell 2 which is normally plugged by a screw (not shown). The cable 24 is trained over a pulley 32 supported by a bracket 34 temporarily secured by screws to the shell 2, so as to exert a predetermined horizontal force on the shell 6 approximately equivalent to percentage of the rated maximum flow rate to be handled by the flowmeter. The span adjustment of the amplifier is then altered as necessary to provide an appropriate output. After removal of the weight, calibration can be checked if necessary by feeding material through the flowmeter at a known rate or rates. If there is a divergence between the actual output of the amplifier and that which should be present then the difference is calculated, the test weight is reconnected, and an appropriate span adjustment made. These steps can be repeated until performance of the unit is within tolerance. The bracket 34 and pulley 32 need only be mounted during calibration. The velocity of material striking the impact plate will be somewhat influenced by the configuration of the inlet structure, and this check on calibration permits appropriate allowance to be made for the particular installation of the flowmeter.

FIGS. 4a–4d show various possible installations of the unit with various material inlet and outlet structures shown in broken lines. By comparison with the installations shown on the rear page of the Milltronics brochure outlined above, the installations are much more compact since the shell 2 replaces a bulky rectangular housing, and adaptation of the outlet structure to comparatively small diameter of the shell 2 is in general much simpler than adaption to a large rectangular outlet.

By comparison, the Milltronics HIFLO (Trade Mark) model E40 flowmeter, constructed in accordance with the Tomiyasu U.S. Pat. No. 3,640,135, has a height, even without an outlet adaptor, from inlet to outlet, of 34 inches, a generally rectangular enclosure 16 inches by 16 inches by 25 inches high, and a large housing projecting from one side of the enclosure. Whilst the projecting housing can be eliminated by use of the teaching of the Schindel U.S. patent, the bulky enclosure remains. In contrast, a typical unit in accordance with the present invention, which can be substituted for the model E40 in many applications, has a height from inlet to outlet of only 18 inches and does away with the bulky rectangular housing.

It is found furthermore that the response of the present apparatus to varying flow rates is more linear. It is believed the semi-cylindrical third shell which forms the impact plate provides a less disturbed flow through the apparatus, strictly comparable to that through an elbow in a pipe, than does a conventional flat impact plate, which fails to provide lateral containment of the flow with the result that according to flow rate, a varying proportion of material is deflected outwardly thus producing non-linearity of response.

Not only is the apparatus more compact, but it is also substantially simpler and cheaper to fabricate. Since the deflector plate is vertical, substantially only horizontal reaction forces are developed by it, thus avoiding the necessity for resolution of the wanted force components, whilst build up of material on the plate cannot generate forces which will be sensed by the load cell. Material build up is in any case less likely with the deflection plate disposed vertically. There is no dead load applied to the load cell, since it only reacts to horizontal forces, and the weight of the third shell forming the deflector plate is applied vertically. This also allows the entire sensing range of the load cell to be utilized effectively.

We claim:

1. An impact flowmeter comprising a first vertically extending cylindrical shell having a first internal diameter and providing an outlet for fluent material at a lower end thereof, a second downwardly inclined cylindrical shell having a second internal diameter less than said first internal diameter, and a lower end which enters a side wall of the first shell and opens within and intermediate the ends of the latter, said second shell providing an inlet for fluent material at its upper end, a third vertically extending semi-cylindrical shell having a third internal diameter intermediate said first and second internal diameters, said third shell being located within the first shell with a concave side thereof facing the lower end of the second shell, and a parallelogram strain gauge cell connected between an upper end of the third shell and an upper end of the first shell so as to sense horizontal forces applied to the third shell from the direction of the second shell.

2. An impact flowmeter according to claim 1, wherein the lower end opening of the second shell lies in a generally vertical plane within the third shell.

3. An impact flowmeter according to claim 1, wherein a closure plate closes the upper end of the first shell.

4. An impact flowmeter according to claim 1, further including calibration means, the calibration means comprising a calibration weight and a cable supporting the calibration weight, means for attaching the cable to an outside surface of the third shell opposite from the second shell, a pulley, and means for mounting the pulley on the outside of the first shell opposite the second shell and in a common vertical plane with the longitudinal axes of the shells, an uppermost portion of the pulley being in line with the means for attaching the cable and with an aperture defined in the wall of the first shell such that the calibration weight may be hung over the pulley to exert a horizontal force upon the third shell which is equal to a downward force exerted by the calibration weight.

5. An impact flowmeter comprising a vertical tubular cylindrical housing having a bottom outlet, a part cylindrical impact plate of smaller diameter than an internal diameter of the housing, means mounting the impact plate within and coaxial with the housing, an inclined inlet tube of less internal diameter than the impact plate and having a lower end entering the housing on an axis such that fluent material descending the inlet enters the housing on a trajectory intercepted by an internal surface of the impact plate, and strain gauge elements associated with the means mounting the impact plate to sense horizontal forces sustained by the impact plate as a result of intercepting fluent material from the inlet tube.

* * * * *